United States Patent [19]
Matuschke

[11] 3,768,946
[45] Oct. 30, 1973

[54] FREQUENCY CARRIER MOLDING APPARATUS

[76] Inventor: Walter Matuschke, Kaiser-Wilhelm-Str. 6, 2 Hamburg 36, Germany

[22] Filed: Apr. 5, 1971

[21] Appl. No.: 131,289

[30] Foreign Application Priority Data
Apr. 4, 1970 Germany .................. P 20 16 228.1

[52] U.S. Cl. ................... 425/363, 264/106, 425/384
[51] Int. Cl. ........................... B29c 3/02, B29c 15/00
[58] Field of Search ................... 425/363, 383, 384, 425/385, 394, 404, 407, 406, 294, 299

[56] References Cited
UNITED STATES PATENTS

| | | | |
|---|---|---|---|
| 2,529,083 | 11/1950 | Keefe | 264/106 X |
| 2,425,043 | 8/1947 | Moore | 229/14 |
| 1,996,057 | 4/1935 | Buckle | 264/106 X |
| 3,131,425 | 5/1964 | Jacobs et al. | 425/363 X |
| 3,121,913 | 2/1964 | Hagmann et al. | 425/363 |
| 3,479,694 | 11/1969 | Winstead | 425/4 |
| 3,602,944 | 9/1971 | Szabo et al. | 425/384 X |
| 3,333,032 | 7/1967 | Dickinson | 425/384 X |

Primary Examiner—Robert L. Spicer, Jr.
Attorney—Beaman & Beaman

[57] ABSTRACT

A method of producing plate-like supports on which frequencies are recorded, and having an impressed surface, comprises the successive pressing of fractional areas of a support in chronological sequence. The supports may be records applied in succession onto one strip of the pressed material and subsequently stamped out individually from the strip or cut out therefrom with fractional and rectangular surrounding areas of the strip. A device for carrying out the method comprises two parallel cylinders rotatably mounted in a machine frame, at least one of which can be driven and is adapted to receive impression-applying dies for pressing the strip surface. The strip is fed between the cylinders and comprises a surface layer capable of taking the impression and a supporting layer of a different material. When both sides of the strip are to be impressed two such surface layers are provided with an intermediate supporting layer sandwiched between them.

4 Claims, 5 Drawing Figures

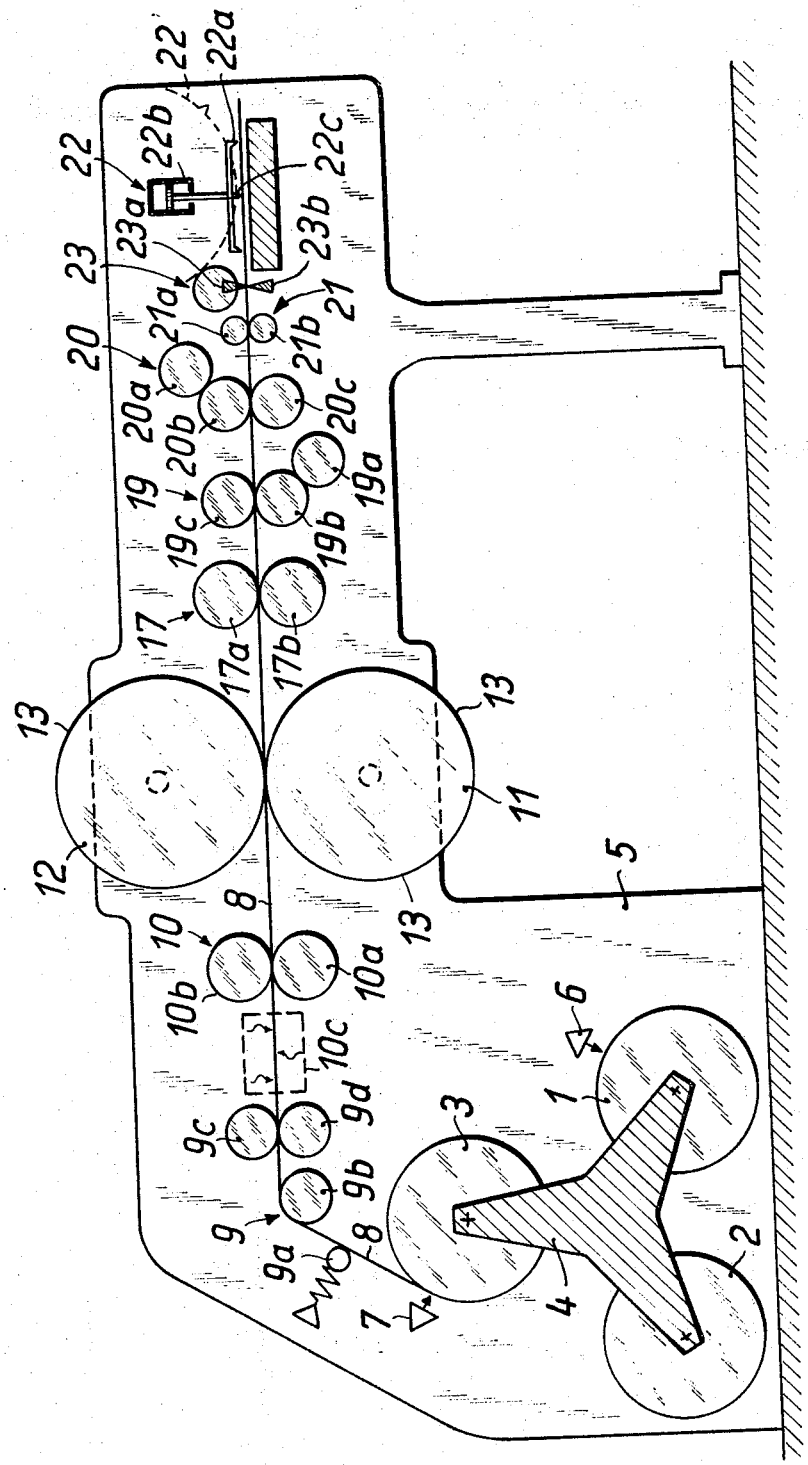

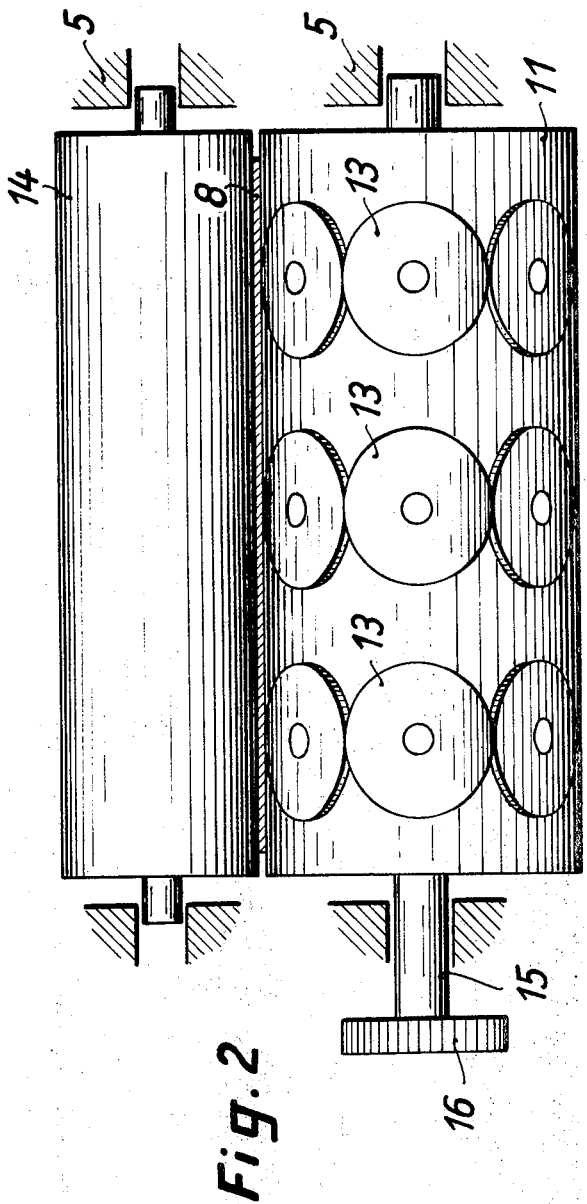
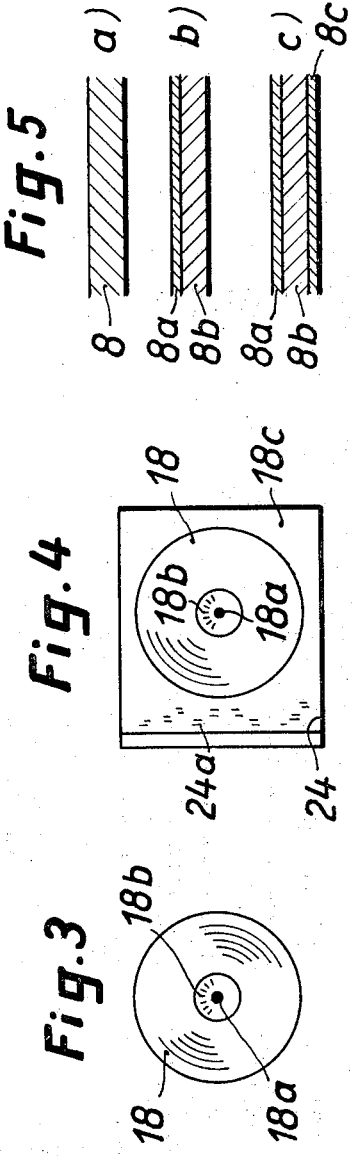

FREQUENCY CARRIER MOLDING APPARATUS

This invention relates to a device for producing plate-like supports recording frequencies and having an impressed surface, more especially to a device for producing records.

It is an already known technique to manufacture records in presses in which material capable of taking an impression is exposed to pressure from flat pressure-applying dies or matrices with the concurrent application of heat. In order to insert the material and to remove the duly impressed plates, one die has to be removed by a second die, or by a structural member exerting counter-pressure and replacing the second die. The period taken for the closing and opening movement of the stamping device comprises a substantial proportion of the time occupied in fabricating a single record, and renders it impossible to produce massive editions comprising several hundred thousand records within a short period unless an economically unacceptable number of presses is put into operation. Such massive editions are, however, regarded as desirable for informing rather large groups of a population.

The invention, therefore, has for its object the task of providing a device which will substantially reduce the production time for a single record and thus will render possible the production of large editions of records in a single working shift.

In a device in accordance with the invention, fractional areas of the surface of each support or record are pressed successively in a chronological sequence. By this device the production of a support or record is accelerated, as the record can move in relation to the impression-applying location because of the chronologically successive procedures for applying impressions on fractional areas. The duration of impression-applying is determined by the sum of the periods that are required in order to make an impression on the surface of the record. The sum of these time-conditioned intervals is substantially smaller than the duration of a pressing operation as hitherto required.

Preferably the moulded shapes of a plurality of records are applied in succession upon one strip, and the records thereafter stamped out individually from the strip or else cut out together with fractional surrounding areas of the strip. By pressing several records in one strip the set-up and shut-down time is decreased, as there is then no need for the separate preparation of an amount of record material for each individual record.

The invention is characterised by a cylinder rotatably mounted in a machine frame and capable of being driven round therein, the cylinder being adapted to receive impression-applying dies intended for pressing the records, and by a structural member cooperating with the cylinder to exert a counter-pressure, in use the strip being fed between these two units.

Through the rotation of the cylinder the effect is achieved that fractional areas of the surface of the strip receive impressions in succession from the impression-applying dies in a time-conditioned sequence. Since the cylinder is positioned at a fixed location within the machine frame, the strip has to be able to pass between the impression-applying cylinder and the structural member exerting the counter-pressure.

It is preferred that the structural member for exerting counter-pressure should be a second cylinder rotatably mounted in the machine frame with its axis parallel to the axis of the first cylinder. Such structural members providing counter-pressure have proved their worth in rotary presses.

If the records are to be provided with an impressed surface on only one side, then the second cylinder will have a smooth, uninterrupted surface. If, however, it is desired that the record is to receive an impression on both sides, then the second cylinder will likewise be formed as an impression-applying cylinder.

In order to eliminate distortions when the record is played by means of suitable record-playing devices, according to the invention it is provided that around the periphery of the first and/or of the second cylinder there is arranged at least one die for applying an impression to a circular record, and that the diameter of the impression-applying cylinder is so selected, in dependence on the diameter of the record, that no distortions will occur on the resultant records. It is preferable that the ratio of the cylinder-diameter to the record-diameter should lie in the range between approximately 6:1 and 4:1.

Since the periphery of each impression-applying cylinder has to be many times the measurement of the diameter of the record in order to obviate distortions vis-a-vis the master original, a multiplicity of impression-applying dies can be arranged in a circumferentially aligned series. The content of these dies can be identical, or can vary from die to die of the series.

In order to increase the number of records receiving an impression during each rotation of the cylinder, it is recommended, depending on the width of the cylinder and/or the strip, that a plurality of impression-applying dies should be arranged adjacently in the axial direction. The number of records produced per cylinder rotation will then, given a symmetrical arrangement, equal the product of impression-applying dies disposed in series around the periphery of the cylinder multiplied by the number of die series arranged adjacently axially of the cylinder.

For forming the impression-applying dies, according to the invention, two different embodiments are proposed. In one such embodiment the dies are formed directly on the surface of the pertinent cylinder; they may, for instance, be etched into the surface of the cylinder. The other of these embodiments is characterised in that the impression-applying dies are formed on separately prepared die-type plates which are attachable to the cylinder. The mounting means required for this are already known and may correspond to the mounting means used on rotary presses; they are mostly carried into effect as bevel-edged mounting means.

In order to store in the device an adequate supply of strip arranged in a length for records, according to the invention the device may further be characterised by at least one roll constituting supply means located within the machine frame to provide a flexible strip, and a unit for unwinding the strip. Such arrangements for unwinding the strip from a roll are already adequately known in the packaging industry. It is recommended that there should be provided at least three rolls constituting the supply means, and a strip-splicing device may provide for the completely automatic splicing of the strip, this being so as not to interrupt the production process. Such devices are already known in the printing trade.

If a material in strip form whose ability to take an impression from a die is improved by being heated is employed for producing records, then provision is preferably made for the first and/or the second cylinder to be able to be heated. If the heating of the material at the location of where the impression is applied is itself insufficient, then it is useful to interpose a heating device to warm up the strip between the unwinding unit and that location; it is also conceivable that this heating device will not only act to preheat the strip but will be the sole source of heat. In order to facilitate further processing of the strip after impression, in a useful embodiment of the device a cooling unit is provided subsequent to the location where the impression is applied.

A preferred embodiment of device according to the invention is characterised by a separating unit to stamp the records out to shape or to cut away areas of the strip immediately surrounding the individual records.

The separating unit may be either a reciprocating unit or a rotating unit. The choice is made according to the speed of rotation of the impression-applying cylinders. Given a rapid rate of application, a high stamping rate has also to be achieved. It is also possible to impress the strips and only later to feed the duly impressed strips into detached separating units.

If the record is to be played on a record player with a centering spindle, then a hole is desirably punched in the record by a suitable stamping device during the separating process.

In order to be able to incorporate the records into periodicals or books it is recommended that the areas of foil cut out simultaneously with the record should be of a rectangular shape. In order to be able subsequently to part the records from the areas of strip concurrently cut out, the separating unit will preferably be so formed that the records inside the cut-out areas of strip are provided with peripheral lines of weakness.

In order to be able to print titles and accompanying texts on the duly impressed discs and the associated areas of strip, the device according to the invention may be further characterised by at least one printing unit situated between the location where the impression is applied and the separating unit. To achieve uniform feeding of the strip into the separating unit an arrangement for advancing the strip may be interposed between the printing unit and the separating unit.

From the information provided hereinafter it emerges that according to the invention at least the surface layer on one side of the strip consists of a material capable of taking an impression.

The strip is preferably characterised by the combination of an intermediate supporting layer and an upper and/or lower layer capable of taking an impression. Several of the modern synthetic resins are available for producing such a strip; according to the invention it is therefore envisaged that the strip will be a flexible synthetic-resin foil made from a material able to take an impression and softening under the effect of temperature.

The invention will now be further described with reference to the accompanying drawings which illustrate, by way of example, a device in accordance with the invention. In the drawings:

FIG. 1 is a diagrammatic longitudinal section taken through the device,

FIG. 2 is a top view of a cylinder of the device for applying impressions and which cooperates with a cylinder exerting counter-pressure, FIG. 3 is a pressed record duly stamped out, FIG. 4 is a record cut off from a strip, and FIG. 5 shows several cross-sections taken through various strips.

In FIG. 1 three rolls 1, 2, 3 for supplying the strips of material are positioned in a rotatable part 4 of the machine frame 5 of the device. Of a strip-splicing unit, FIG. 1 includes a diagrammatic view of merely an adhesive-applying device 6 and a pressure-exerting device 7. By means of an unwinding device 9 a strip 8 is withdrawn from the supplying roll 3. Associated with the unwinding device 9 are a tensioning roller 9a, a deflection roller 9b and a pair of traction rollers 9c and 9d which are rotatably driven. After these devices, the strip 8 is guided through a heating arrangement 10 which consists of two heating rollers 10a and 10b in contact with the strip 8.

As indicated in broken lines in FIG. 1, the heating arrangement may be a heating tunnel 10c through which the strip passes and in which the strip 8 is warmed by radiant heat. The strip emerging from the heating arrangement 10 is guided between a first cylinder 11 and a second cylinder 12, both applying impressions to the strip. On each of these cylinders, around their periphery, six circumferentially arranged dies 13 for applying impressions to the strip are fastened. Moulded shapes are therefore formed on the two opposite side surfaces of the strip 8. In the impression-applying cylinder 11 shown in FIGS. 1 and 2 the diameter of the circular dies 13 are in a ratio of 1:6 to the diameter of the cylinder. By this means the effect is achieved that distortions on the resultant records in relation to the original master recording are obviated.

In FIG. 2 the cylinder 11 cooperates with a cylinder 14 exerting counter-pressure and having a smooth, uninterrupted surface, so that the strip 8 receives an impression on one side only, whereas in the embodiment according to FIG. 1 an impression on both sides of the strip is effected.

Cylinders 11, 12 and 14 are mounted in the machine frame 5 so as to be rotatable and replaceable. At least one roller in each pair of these cylinders must be driven, and to this end a toothed wheel 16 is fastened to a shaft 15 of the cylinder 11. It is useful, however, if both cylinders can be driven. Cylinders 11 and 12 are heatable, so as to assist the process of applying an impression. According to the material employed for the strip, the heating procedure can be adjusted by a suitable choice of temperatures for the heating rollers 10a and 10b, and in the cylinders themselves. It is conceivable that in the case of certain materials preheating by the heating arrangement 10, or heating solely by the cylinders 11 and 12, will be sufficient.

In order to cool down the impressed strip before further processing, it is guided through a cooling arrangement 17 consisting of two cooling rollers 17a and 17b.

Since the recorded content cannot be seen from the duly impressed form of the records 18, the strip 18 when cooled is guided into a printing unit 19 for printing data on the lower side of the strip, and then into a printing unit 20 for printing data on the upper side of the strip. Of the two printing units there is here respectively shown an inking roller 19a and 20a, a chasing form cylinder 19b and 20b, and a cylinder 19c and 20c exerting counter-pressure. The illustration of the printing units 19 and 20 is merely to provide a general indication; all known types of printing units may be employed.

Following the printing unit 20 there is interposed a strip-advancing arrangement 21, which in the embodiment shown in FIG. 1 consists of two strip-advancing rollers 21a and 21b.

In order to separate the individual records 18, the device illustrated includes a separating unit 22. It should be noted that the strip 8, already duly impressed and printed, can alternatively be once more rolled up to form a roll, in order to be fed into a separating unit subsequently. The separating unit 22 in the embodiment shown consists of a stamping-out plate 22a which is raised and lowered by a piston-and-cylinder drive 22b. The lifting mechanism stroke is only slightly larger than the thickness of the strip 8. The stamping-out plate is provided with a centrally disposed punching tool 22c which stamps a hole into the record 18 for fitting on the central spindle of a record player. (In FIG. 1 an alternative separating unit 22' operating in a rotary manner is illustrated in chain-dotted lines). Instead of a separating unit for the stamping-out process it is also possible to provide a separating unit 23 which serves to cut off the areas 24 of the strip within which the record 18 is situated. Of this cutting device only an upper blade 23a and a lower blade 23b are illustrated. The area 24 of the strip shown in FIG. 4 is rectangular and is consequently suitable for incorporation or insertion into books or periodicals. It is possible by means of the printing units 19 and 20 to print not only on the record at the locations 18b but also on the area of strip at the locations 24a.

In order to be able to separate the record 18 easily from the area 24 of strip, the stamping-out unit 22 is so arranged that the record 18 is provided with a line of weakness 18c around its periphery. The record can easily be squeezed from the area 24 of strip along this line of weakness 18c.

FIG. 5 shows various strips 8 such as can be employed in the device described. The strip 8 shown in FIG. 5a is a synthetic-resin foil which consists entirely of a material capable of taking an impression. The strip 8 shown in FIG. 5b consists of an upper layer 8a capable of taking an impression and of a supporting layer 8b, and is consequently suitable for the production of records impressed on one side only. The strip according to FIG. 5c consists of an impression-accepting upper layer 8a and an impression-accepting lower layer 8c, between which is sandwiched a supporting layer 8b.

In accordance with the method according to the invention, considerable numbers of supports recording frequencies, more especially records, can be produced utilising the described device. These high totals of records can be produced both more speedily and also more economically than previously in that they receive impressions while in moving strips and in that several dies 13 providing impressions are arranged adjacently around the periphery of the impression cylinder or cylinders, so that in the embodiment illustrated in FIG. 2 18 records receive an impression during one rotation of the impression cylinder 11.

I claim:

1. A device for the continuous high speed production of foil records having an impressed surface on which frequencies are recorded comprising, in combination, a machine frame, foil strip treating means mounted on said machine frame defining a path of movement for sequential treatment of foil strip, a dispenser dispensing foil strip into said treating means, said treating means comprising, in succession, with respect to the direction of said path of foil strip movement, a pair of rotatably driven traction rollers mounted on said frame receiving said foil strip therebetween from said dispenser, heating means defined on said machine frame receiving said foil strip and heating said strip to an impression receiving temperature, a pressing cylinder rotatably and drivably mounted on said machine frame receiving foil strip from said heating means and bearing impression-applying dies for pressing said records, a second cylinder rotatably mounted on said machine frame with its axis parallel with the axis of said pressing cylinder cooperating with said cylinder to exert a counter-pressure on said foil strip as it passes between said cylinders, a pair of parallel, opposed, cooling rollers rotatably mounted on said machine frame receiving said foil strip therebetween from said cylinders cooling said strip, a pair of parallel opposed, advancing rollers rotatably mounted on said machine frame receiving said foil strip therebetween advancing said strip to separating means, and rotatable separating means mounted on said machine frame receiving foil strip from said advancing rollers rotating in synchronization with said pressing cylinder for separating predetermined areas defined on said foil strip each containing a record impression.

2. A device for the continuous high speed production of foil records as in claim 1 wherein said heating means comprises a pair of parallel opposed rollers rotatably mounted on said machine frame.

3. A device for the continuous high speed production of foil records as in claim 1, printing means comprising at least one pair of parallel, opposed, printing rollers rotatably mounted on said machine frame located between said cooling rollers and said advancing rollers and receiving said foil strip therebetween printing said foil prior to separation of said predetermined areas from said strip.

4. A device for the continuous high speed production of foil records as in claim 3, wherein said printing means comprises two sets of pairs of parallel, opposed printing rollers rotatably mounted on said machine frame, said foil strip being received between the rollers of each pair, one of said pairs printing said foil strip on one side thereof, and the other pair printing the opposite foil strip side.

* * * * *